United States Patent [19]

Lin

[11] 4,444,562
[45] Apr. 24, 1984

[54] LIGNIN-BASED DISPERSANTS ESPECIALLY ADAPTED FOR THERMOSOL DYEING

[75] Inventor: Stephen Y. Lin, Wausau, Wis.

[73] Assignee: Reed Lignin, Inc., Greenwich, Conn.

[21] Appl. No.: 308,119

[22] Filed: Oct. 2, 1981

Related U.S. Application Data

[63] Continuation-in-part of Ser. No. 123,696, Feb. 22, 1980, Pat. No. 4,308,203.

[51] Int. Cl.³ .................. C07G 1/00; C09K 3/00; D06P 67/00
[52] U.S. Cl. .................................. 8/528; 8/560; 8/589; 8/933; 106/123 R; 106/123 LC; 106/316; 260/124 R; 527/403
[58] Field of Search ............ 106/123 R, 123 LC, 316, 106/123; 8/589, 528, 560, 933; 260/124 R, 124; 527/403

[56] References Cited

U.S. PATENT DOCUMENTS

| | | | |
|---|---|---|---|
| 3,347,842 | 10/1967 | Meinychyn | 106/123 R |
| 3,388,061 | 6/1968 | Markham | 527/403 |
| 3,546,197 | 12/1970 | Benko | 260/124 R |
| 3,769,272 | 10/1973 | Hintz | 260/124 R |
| 3,841,887 | 10/1974 | Falkehag et al. | 106/123 LC |
| 3,956,261 | 5/1976 | Lin | 260/124 R |
| 4,001,202 | 1/1977 | Dilling et al. | 260/124 R |
| 4,017,475 | 4/1977 | Ludwig | 260/124 R |
| 4,184,845 | 1/1980 | Lin | 260/124 R |

*Primary Examiner*—Melvyn I. Marquis
*Assistant Examiner*—A. H. Koeckert

[57] ABSTRACT

Dispersants, especially well suited for use in thermosol dyeing processes, are produced by reacting methylol hydroxybenzene compounds with sulfonated lignin derivatives. The dispersants have high levels of heat stability and low staining characteristics, coupled with desirable dye reduction, foaming, milling and viscosity-reducing properties. Dyestuffs, dye pastes, and dye baths, as well as methods utilizing them, are provided.

41 Claims, No Drawings

LIGNIN-BASED DISPERSANTS ESPECIALLY ADAPTED FOR THERMOSOL DYEING

CROSS-REFERENCE TO RELATED APPLICATION

This application is a continuation-in-part of copending Application for U.S. patent Ser. No. 123,696, entitled SULFONATED LIGNIN DISPERSANTS AND DYESTUFFS AND METHODS UTILIZING THE SAME, filed on Feb. 22, 1980 and now issued as U.S. Pat. No. 4,308,203.

BACKGROUND OF THE INVENTION

This invention concerns sulfonated lignin derivative dispersants and, more particularly, the use of such dispersants in thermosol dyeing formulations and processes.

As used herein, the term "lignin" has its normal connotation, and refers to the substance which is typically recovered from alkali paper pulping black liquors, such as are produced in the Kraft, soda and other well-known alkali pulping operations. The term "sulfonated lignin", as used in this specification, refers to the product which is obtained by the introduction of sulfonic acid groups into the lignin molecule, as may be accomplished by reaction of the lignin with sulfite or bisulfite compounds. As used herein, the term "lignosulfonate" refers to the reaction product of lignin which is inherently obtained during the sulfite pulping of wood, and is a principal constituent of the spent sulfite liquor which is derived from that process. Finally, the phrase "sulfonated lignin material" encompasses not only the lignin and lignosulfonate reaction products hereinabove described, but also spent sulfite liquors, which materials may be further reacted (such as for desugaring), purified, fractionated, or the like, as may be appropriate for the particular material involved, and as will be more fully discussed hereinbelow.

It is well known that sulfonated lignin materials may be utilized to considerable advantage as dispersing agents for numerous products, such as clays, insecticides, pesticides, dyestuffs, etc. The provision, however, of a satisfactory dyestuff dispersant represents a particularly difficult task, in view of the fact that it must exhibit a desirable balance of properties, some of which are generally found to be inconsistent with others. Accordingly, it is usually necessary to compromise, and to accept a relatively poor level of performance in one or more respects, in order to achieve good performance levels in other respects. In a disperse or vat dye dispersant, for example, the ideal dispersing agent would exhibit excellent heat stability, coupled with low azo dye reducing and staining properties. It should also minimize foaming, afford maximum milling efficiency (i.e., produce small particle sizes in minimum periods of time), and it should furthermore reduce the viscosity of the dye paste in which it is ultimately employed. Heat stability is especially important in dispersants employed in compositions used in thermosol dyeing processes, so as to ensure effectiveness under the high temperature conditions of fixation.

As an example of the fundamental inconsistency of certain of the foregoing objectives, which has heretofore been fully appreciated, sulfonated lignin products exhibit excellent high temperature stability, but also tend to stain and to produce high levels of azo dye reduction. Conversely, the lignosulfonates exhibit relatively low levels of azo dye reduction, but are deficient from the standpoint of adequate heat stability, for many applications. In general, it has been found that milling efficiency and heat stability are inconsistent properties, and that a dispersant which exhibits one of them will generally tend to be rather deficient, insofar as the other is concerned. Finally, while the lignosulfonate products generally have a somewhat reduced tendency to stain fabrics to which they are applied, as compared to the sulfonated lignin products, the demand remains for lignin-based dispersants that exhibit low levels of staining, particularly in thermosoling applications.

In view of the fact that most disperse and vat dyes are either quinone of azo dyes, the need to avoid reduction reactions is particularly important, since the failure to do so results in the need to utilize unduly large amounts of the dye to compensate for the reduction caused by the dispersant. Many attempts have been made in the art to improve the azo dye reducing and staining properties of sulfonated lignin dispersants, which attempts have generally taken the route of blocking the free phenolic hydroxyl groups of the lignin. Exemplary of such attempts are those described in U.S. Pat. Nos. 3,672,817, 3,763,139, 3,769,272, and 3,865,803. While the foregoing methods are somewhat effective, they tend to be rather costly to carry out, and the results achieved are still less than satisfactory.

Similarly, in view of the need to provide good high temperature or heat stability, so as to enable the utilization of the dyestuff in current conventional dyeing procedures, attempts have been made to improve that property in lignosulfonate products. Typical of such attempts is that which is set forth in U.S. Pat. No. 3,864,276, which describes a dispersant obtained by crosslinking spent sulfite liquor solids and Kraft liquor solids. Ultrafiltration, which may be followed by desulfonation of the product, has also been attempted in order to improve heat stability, and several products made in accordance with such techniques are commercially available. Oxidation and desulfonation of spent sulfite liquor, in an alkaline medium with air or oxygen (as in vanillin production), is yet another approach which has been utilized in an effort to improve heat stability of lignosulfonate products. However, all of the foregoing methods invariably darken the lignosulfonate, thereby elevating the level of staining which is produced when they are utilized; such treatments also tend to increase the azo dye reducing propensity of the product. These results, moreover, are accompanied by less than satisfactory improvement in the high temperature stability characteristics of the products involved.

Accordingly, it is the primary object of the present invention to provide novel dispersants produced from sulfonated lignin materials.

It is a more specific object of the invention to provide such dispersants which exhibit an optimal balance of properties, rendering them highly suited for use as dispersants for disperse and vat dyestuffs.

Another specific object of the invention is to provide sulfonated lignin product dispersants which exhibit relatively low staining and azo dye reducing properties, and to provide lignosulfonate dispersants exhibiting greatly improved levels of heat stability, rendering them particularly well-suited for use in thermosol dyeing processes.

Yet another object of the invention is to provide dispersants from sulfonated lignin materials, which afford superior milling efficiency, as compared to similar dispersants of the prior art.

Still another object of the invention is to provide novel dispersants of the foregoing sort, which are relatively inexpensive and simple to produce.

Additional objects of the invention include the provision of dyestuff compositions, pastes, and dye baths based upon dispersants of the foregoing type, and to provide methods for their utilization.

SUMMARY OF THE DISCLOSURE

It has now been found that certain of the foregoing and related objects of the present invention are readily attained in an adduct of a sulfonated lignin material containing about 2 to 8 percent by weight of organic sulfur, and about 0.05 to 4.0 millimoles, per gram of lignin in the material, of a methylol hydroxybenzene compound, the latter having the general formula:

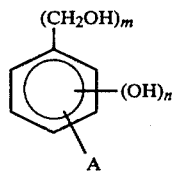

wherein "m" and "n" are both integers from 1 to 3, the total of which does not exceed 4, and wherein "A" is a 1- to 4-carbon alkyl group, which is optionally present thereon.

To be most satisfactory, the adduct of the foregoing composition will produce, in a thermosol stain test, a reflectance value of at least 70, as determined at 457 nanometer units. In certain embodiments of the invention, the lignin material will be a lignosulfonate in which the amount of organic sulfur is about 4 to 8 percent, and may comprise a spent sulfite liquor. In other instances, the lignin material may be a sulfonated lignin, containing about 2 to 7 percent of organic sulfur.

The methylol hydroxybenzene compound will preferably be present in an amount of at least about 0.5 millimoles per gram of the lignin moiety, and most desirably about 1.0 to 2.5 millimoles thereof will be present. Normally, the methylol hydroxybenzene compound will be one in which the value of "n" is 1 and "A" is absent, and preferably the adduct will be the product of a mixture of the methylol hydroxybenzene compounds, the averaged "m" value thereof being 1.3 to 1.8.

Certain objects of the invention will be attained in a method for the production of a lignin adduct comprising, as a first step, forming an aqueous reaction mixture of a sulfonated lignin material and a methylol hydroxybenzene compound, the amount and composition thereof being as is hereinabove specified. A temperature in the range of at least 100° to about 180° Centigrade, a pH of about 3 to 12, and a pressure above atmospheric are maintained, for a period of about 5 minutes to 8 hours, to substantially convert the lignin material and the compound to the lignin adduct. In preferred embodiments of the method, the properties of the adduct and of the starting materials utilized will be as specified above in regard to the compositions of the invention. The method is most desirably effected by carrying out the adduct-forming reaction at a temperature in the range of about 125° to 145° Centigrade, and under autogenous pressure conditions.

In especially preferred embodiments of the method, it will additionally include steps, effected prior to the formation of the reaction mixture of the lignin material and the methylol hydroxybenzene compound, to produce the latter in substantial amounts. More particularly, a methylolation reaction mixture, comprised of a hydroxybenzene compound and formaldehyde, will be formed, and reaction conditions established and maintained therein. Generally, the methylolation reaction mixture will be aqueous, and the reaction conditions will include a pH value of about 10.5 to 12, a temperature of about 60° to 80° Centigrade, atmospheric pressure, and a period of at least 15 minutes duration; the formaldehyde will desirably be present in a ratio to the hydroxybenzene compound of about 1 to 3:1, and will be substantially completely consumed during the methylolation reaction. Most desirably, the pH will have a maximum value of 11.5, the period of reaction will be about one-half to two hours, and the formaldehyde:hydroxybenzene compound ratio will be about 1.3 to 1.8:1; as a practical matter, phenol will generally be employed as the hydroxybenzene compound. The provision of the lignin adduct, produced by the instant method, also achieves certain objects of the invention.

Further objects are attained in a dyestuff composition comprising a water-insoluble dye and a lignin adduct having the composition, or produced in the manner, hereinabove described. In such a composition, the adduct will be present in a weight ratio to the dye of about 0.25 to 0.75:1.0. The dye will preferably be selected from the group consisting of disperse and vat dyes and, more specifically, it will usually be a quinone or an azo dye.

Other objects of the invention are attained in a dye paste comprising the foregoing dyestuff composition and water, wherein the dyestuff comprises about 35 to 55 weight percent of the paste. A method of milling enables the attainment of certain additional objects of the invention, in accordance with which the dye paste described is subjected to milling for a period of time sufficient to reduce the water-insoluble particles thereof to a weight average size of about 50 to 200 angstroms.

Yet additional objects of the invention are attained in a thermosol dyeing process wherein a dye paste, as hereinbefore set forth, is applied to the fabric, followed by fixation of the dye at a temperature of at least about 200° Centigrade. Normally, the fabric will subsequently be washed with a reducing solution, such as of a hydrosulfite compound.

DETAILED DESCRIPTION OF THE PREFERRED EMBODIMENTS

Exemplary of the efficacy of the present invention are the following examples, wherein all parts and percentages specified are on a weight basis.

EXAMPLE ONE

To demonstrate the excellent heat stability of the dispersants of the invention, several methylol monohydroxybenzene products are initially produced by reacting formaldehyde with phenol in various ratios: i.e., 1.0, 1.4, 1.6, 1.8, and 2.0 moles of formaldehyde per mole of phenol. Reaction is effected at atmospheric pressure by slowly adding formaldehyde to an aqueous solution of the phenol (the phenol being present in a concentration of about 40 to 50 percent by volume), the pH of which is adjusted with sodium hydroxide to a value of about 11 to 11.5; a temperature of about 60° to 80° Centigrade is maintained for a period of time (typically, about one-half to two hours) sufficient to effect substantially complete conversion, as determined by analysis for residual formaldehyde.

Adducts are produced by reacting each of the foregoing phenol derivatives with a softwood lignosulfonate containing (in percentages) about 63 sodium lignosulfonate (47 lignin, 5.4 organic sulfur, 7 methoxy groups, 3.5 sodium) and 20 reducing sugars, the remainder being inorganic salts, polysaccharides, and the like. The liquor is reacted with sodium hydroxide at a temperature of 90° Centigrade for a period of two hours to revert substantially all of the sugars contained therein to sugar acids, and the reverted liquor has a pH of about 10.7 and a solids content of 35 percent, 60 percent of which comprises the ignosulfonate. The methylol hydroxybenzene compound is reacted with the lignosulfonate by introducing into the reaction mixture about 2.4 millimoles of the methylol hydroxybenzene compound per gram of lignin in the reverted lignosulfonate liquor, and heating the mixture in a closed vessel at 105° Centigrade for a period of about 5 hours; the product is then spray dried.

Each of the adducts thus produced is milled with Disperse Blue 79 dye (conforming to the specifications set forth therefor in the Color Index) to reduce the dye particle size sufficiently to permit the product to pass the "2 by 4" test of the American Association of Textile Chemists and Colorists. In particular a 40 percent solids paste of the dye is admixed with each of the adducts in a 3:1 (dye:adduct) ratio, and is milled (for the amount of time necessary) in a sand mill, using sand in a ratio of about 3:1 to the solids of the paste and operating the mill at a rate of 2,000 revolutions per minute. The "2 by 4" test is carried out by vacuum filtering a 2.5 gram aliquot of the milled dye paste, (i.e., one gram of dye paste solids) diluted to 200 milliliters with distilled water, through a Buchner funnel containing No. 2 and No. 4 Whatman filter paper.

To determine heat stability, the dye paste is heated in a brass bomb in an oven for 1.5 hours at a temperature of 135° Centigrade. The contents of bomb are diluted by admixing 2.5 grams of the 40 percent solids dye paste with sufficient distilled water to provide 150 milliliters, and, after cooling to room temperature, the dye solution is reheated to about 80° to 85° Centigrade and filtered through a No. 2 Whatman paper. The filtration time and the dye residue weight on the filter are noted, low residue weights being indicative of good heat stability.

As a result, it is found that the adducts prepared as above all exhibit good levels of heat stability, with the 1.4 to 1.8:1 (formaldehyde:phenol) methylol hydroxybenzene compounds imparting especially good stability. Specifically, the 1.0, 1.4, 1.6, 1.8 and 2.0 (formaldehyde:phenol) adducts result in about 124, 29, 20, 32, and 55 milligrams of residue on the filter paper, respectively. By extrapolation, it is expected that an adduct made from a 1.3:1.0 formaldehyde:phenol ratio in the methylol hydroxybenzene compound would produce residue of about 50 milligrams, also representing a good degree of heat stability. The pastes prepared are found to pass through the filter paper relatively quickly, thus indicating the good milling properties that are imparted by the present dispersants, and the adducts are found to exhibit low foam stabilizating and azo dye reducing characteristics.

EXAMPLE TWO

NORLIG 42, a hardwood lignosulfonate product sold by American Can Company, of Greenwich Connecticut, is reacted with methylol phenol at various temperatures and for different periods of time, to produce samples for thermosol stain testing. The methylol phenol is prepared in the manner described herein, utilizing a 1:1 molar ratio of formaldehyde-to-phenol in the reaction mixture, and carrying the reaction to completion (as determined by formaldehyde analysis). The adduct is formed by reacting, under autogenous pressure conditions, 22 parts by weight of the methylol phenol with 100 parts of the NORLIG 42 (equivalent to about 2.4 millimoles of the methylol phenol per gram of lignin).

To prepare test solutions, 3 grams of each of the adducts is dissolved in 100 grams of distilled water, the pH of which is adjusted to 5.5 with acetic acid. Swatches of a polyester/cotton (65/35) fabric are soaked in the test solutions (at room temperature) for a period of 15 minutes, and are then removed and squeeze dried between paper towels. The samples are thereafter air dried for 90 seconds in an oven maintained at 213° Centigrade, after which they are briefly washed in a soap solution of 3 grams per liter of DUPONOL ME (E. I. du Pont de Nemours & Co.), rinsed with water, immersed for five minutes in a reducing solution of sodium hydroxide and sodium hydrosulfite (40 grams per liter of each) at 60° Centigrade, again rinsed in water, and finally air dried.

The reflectance of each of the swatches is measured in accordance with standard procedures on a Martin-Sweet reflectometer, at 457 nanometer units and with a magnesium oxide standard. The results are set forth in Table One, which follows:

TABLE ONE

| Temperature (C.) | Time (min.) | Reflectance |
| --- | --- | --- |
| 115° | 10 | 56.6 |
| " | 20 | 59.3 |
| " | 40 | 59.2 |
| " | 60 | 65.9 |
| " | 120 | 74.1 |
| 125° | 10 | 67.9 |
| " | 20 | 73.8 |
| " | 40 | 71.1 |
| " | 60 | 76.1 |
| " | 120 | 78.7 |
| 135° | 10 | 70.8 |
| " | 20 | 71.9 |
| " | 40 | 75.3 |
| " | 60 | 77.0 |
| " | 120 | 80.6 |

As will be appreciated, high values of reflectance are indicative of low staining, and for purposes of defining good performance in this respect a value of 70 is taken to be the minimum for a dispersant intended for use in thermosol dyeing (which process is simulated by the test procedure of this Example). On the other hand, a reflectance value of 80 is taken to be practical maximum, considering the need to maintain the heat stability, dispersing efficiency, and other required properties. Thus, it can be seen that adducts made in accordance with this invention have outstanding (i.e., low) fiber staining properties, provided that the condensation reaction conditions are adequate.

While other mechanisms are also involved, the principal reaction between the sulfonated lignin compound and the methylol hydroxybenzene compound is believed to be one of condensation, occuring at the hydroxymethyl group(s) of the methylol hydroxybenzene compound and the guaiacyl moiety of the lignin. As has been indicated hereinabove, the reaction will generally be effected in a period of about 5 minutes to 8 hours, depending upon the reaction temperature. If the reaction time is excessive, the product solution and dye paste viscosities may tend to be excessive; undesirably low conversions will, of course, be the principal consequence of inadequate reaction periods. Temperatures in the range of about at least 100° Centigrade to about 180° Centigrade will be employed, with temperatures in the range of about 125° to 145° Centigrade being generally preferred; as a practical matter, the minimum temperature will be at least about 105°. A consequence of excessively high reaction temperatures will be the loss of heat stability, and possible discoloration; a temperature that is too low will dictate the use of a reaction period that is impractically long in duration. Typically, the correlation between temperature and time to produce optimal results will be: 105° for 5 hours, 100° for 8 hours, 125° for 1 hour, 135° for 40 minutes, 155° for 20 minutes, and 180° for 5 minutes, all temperatures being in Centigrade units.

Although it is feasible to carry out the reaction between the sulfonated lignin compound and the methylol hydroxy benzene compound at a pH within the broad range of 3 to 12, preferably the pH will be at least 5, and most desirably it will have a value of at least 10. While the heat stability and the foam stabilizing characteristics of the adduct will usually be best if the pH of the reaction mixture is maintained at 10 or above, discoloration and staining may become excessive if the pH is too high. The reaction will generally be effected at elevated pressures, corresponding to those that develop autogenously in a closed reactor at the temperature of the reaction mixture, as can be predicted from steam tables. However, externally generated pressures may be employed if so desired, and may advantageously increase the reaction rate.

Insofar as the reactants are concerned, it will be appreciated by those skilled in the art that the precise specification of proportions is virtually impossible, due not only to the wide variation that is possible in the nature of the sulfonated lignin compounds that are suitable for use herein,, but also because, even with respect to the most definable compound (i.e., lignin, per se), there is serious dispute as to molecular structure and molecular weight. Hence, the amounts of the modifying reactants used in the reaction are stated herein in units of mole per gram of lignin, ignoring not only the levels of sulfonation that the molecule may contain, but also the presence of other constituents of the sort typically found in spent sulfite and black liquors, such as reverted and unreverted sugars, inorganic salts, sulfonated constituents, and the like. Nevertheless, those skilled in the art will appreciate that deviations from the ratios specified will be common, and that the expression of such ratios is for the purpose of guidance, and need not be strictly adhered to in the practice of this invention.

Regarding the paper pulping liquors, it has hereinabove been pointed out that spent sulfite liquor may be employed, as such, in the reactions of the invention, it may be modified (e.g., by desugaring with sodium hydroxide, by sulfonation and/or sulfoalkylation with suitable sulfite or bisulfite compounds), and/or it may be fractionated to remove certain constituents or to recover the lignosulfonate (which may itself be purified or concentrated). It may be necessary to adjust the amounts of reactants used to produce the adducts of the invention, depending upon the presence of other reactive constituents; however, such adjustments will also be evident to, and readily made by, those skilled in the art.

Particular mention may be made of the sugars contained in spent sulfite liquors, which (together with the inorganic salts) may comprise up to about 50 percent of the liquor solids. Since they tend to reduce azo dyes rather effectively, it is often important to revert them to the corresponding acids. Also, with respect to sulfonation, it will be appreciated that a range of 2 to 8 percent (of organaic sulfur, based upon lignin) has been indicated herein, to encompass the level of sulfonic acid groups (expressed as sulfur) normally and inherently contained in the lignosulfonate of spent sulfite liquor (i.e. 4 to 8 percent), as well as the level which will usually be introduced into lignin to render it effective for use herein (i.e., 2 to 7 percent).

The methylol hydroxybenzene compounds employed to produce the adducts of the invention will generally and preferably be produced by methylolation of an appropriate hydroxybenzene, in view of the obvious economic and practical advantage of doing so. Generally formaldehyde (which may be furnished as paraformaldehyde, formalin, or other reagents) will be reacted with an appropriate hydroxybenzene precursor (e.g., phenol, cresol, resorcinol, pyrogallol), so as to introduce into the molecule the desired number of hydroxymethyl groups; most commonly, phenol will be used.

To effect the methylolation reaction, the formaldehyde ingredient need merely be admixed with a solution of the hydroxybenzene compound, to which sodium hydroxide or its equivalent has been added to provide a pH value of 10.5 to 12 (and preferably 11 to 11.5) in the reaction mixture; high alkalinity is necessary for ionization of the hydroxyl groups. The reaction mixture is maintained at a temperature of about 60° to 80° Centigrade, and it may be necessary to cool the mixture if the formaldehyde is introduced at an excessive rate, because of the exothermic nature of the methylolation reaction. The reaction will generally require a period of fifteen minutes to two hours (depending to an extent upon the level of methylolation to be achieved, and hence the amount of formaldehyde to be added) and, as pointed out above, the end point of the reaction can conveniently be determined by analysis for residual formaldehyde. As will be appreciated, other methods that may be known to those skilled in the art might be employed to produce the desired methylol hydroxybenzene compound; however, the described process is relatively simple and inexpensive, and produces derivatives that in turn result in highly desired lignin adducts, and hence is particularly preferred.

The degree of methylolation of the hydroxybenzene compound will be controlled simply by introducing formaldehyde into the reaction mixture in a molar proportion corresponding to the desired ratio of hydroxymethyl:hydroxybenzene moieties, and carrying the reaction to substantial completion. Although the formaldehyde:hydroxybenzene ratio in the reaction solution may not, on rigorous analysis, correspond strictly to the actual molecular structure of the product, it is believed that (assuming substantially complete conversion) such will be generally true as a practical matter.

As has been indicated hereinabove, the methylol hydroxybenzene compounds that are preferred for use herein have nominal methylol:hydroxybenzene ratios of 1.3 to 1.8:1.0. This is based upon the assumption that the ratios of substituents in the molecules correspond to the ratio of reactants used, and upon the discovery that optimal levels of heat stability are achieved when methylol hydroxybenzene derivatives produced using such ratios of reactants are condensed with the lignin material to form the adducts. Presumably, a methylol hydroxybenzene of this nature is a mixture of compounds, such as the monohydroxymethyl and dihydroxymethyl derivatives, in such proportions as will provide averaged values for the hydroxymethyl moiety within the stated range; of course, the mixture may also contain more highly methylolated derivatives, and no rigorous analysis has been made to determine actual composition.

Thus, it can be seen that the present invention provides novel dispersants produced from sulfonated lignin materials, which dispersants may exhibit an optimal balance of properties, rendering them highly suited for use for disperse and vat dyestuffs, and especially in thermosol dyeing processes. The invention may provide sulfonated lignin dispersants which exhibit relatively low staining and azo dye reducing properties, as well as lignosulfonate dispersants exhibiting greatly improved levels of heat stability. Moreover, the products of the invention afford superior milling efficiency, as compared to similar dispersants of the prior art, and they are relatively inexpensive and simple to produce. In addition, the invention provides novel dyestuff compositions, pastes, and dye baths, as well as methods for their utilization.

Having thus described the invention, what is claimed is:

1. In a method for the production of a lignin adduct, the steps comprising:
   forming an aqueous reaction mixture of a sulfonated lignin material and a methylol hydroxybenzene compound, said mixture containing about 0.05 to 4.0 millimoles of said compound per gram of the lignin moiety in said lignin material, said compound having the general formula:

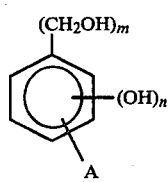

wherein "m" and "n" are both integers from 1 to 3, the total value of "m" and "n" does not exceed 4, and "A" is a one- to four-carbon alkyl group optionally present therein;
   establishing in said mixture a temperature in the range of at least 105° to about 180° Centigrade and a pH of about 3 to 12 to effect reaction between said lignin material and said compound; and
   maintaining said mixture at a temperature in said range and at a pressure above atmospheric for a period of from about 5 minutes to 8 hours to substantially convert said lignin material and said compound to a lignin adduct.

2. The method of claim 1 wherein the conditions established and maintained for said reaction produce an adduct which produces, in a thermosol stain test, a reflectance value of at least 70, as determined at 457 nanometer units.

3. The method of claim 1 wherein said lignin material is a spent sulfite liquor.

4. The method of claim 3 wherein said spent sulfite liquor has been at least partially desugared.

5. The method of claim 1 wherein said lignin material lignosulfonate.

6. The method of claim 1 wherein said lignin material is an alkali lignin sulfonated to an organic sulfur content of about 2 to 7 percent by weight.

7. The method of claim 1 wherein said reaction temperature range is about 125° to 145° Centigrade.

8. The method of claim 1 wherein said pressure is autogenous.

9. The method of claim 1 wherein, in said compound, "n" has a value of 1 and "A" is absent.

10. The method of claim 9 wherein said adduct is the product of a mixture of said methylol hydroxybenzene compounds, said mixture providing an averaged "m" value of 1.3 to 1.8.

11. The method of claim 1 including the additional steps, effected prior to the formation of said reaction mixture of lignin material and hydroxybenzene compound, of:
   forming a methylolation reaction mixture comprised of a hydroxybenzene compound and formaldehyde; and establishing and maintaining therein reaction conditions under which said methylol hydroxybenzene compound is produced in substantial amounts.

12. The method of claim 11 wherein methylolation reaction mixture is aqueous, and wherein said reaction conditions include a pH value of about 10.5 to 12, a temperature of about 60° to 80° Centigrade, atmospheric pressure, and a period of at least 15 minutes duration, said formaldehyde being present in said methylolation reaction mixture in a ratio to said hydroxybenzene compound of about 1 to 3:1, and being substantially completely consumed during said methylolation reaction.

13. The method of claim 12 wherein said hydroxybenzene compound is phenol.

14. The method of claim 12 wherein said pH has a maximum value of about 11.5 and wherein said period of reaction is about one-half to two hours, the molar ratio of formaldehyde to said hydroxybenzene compound present in said methylolation reaction mixture being about 1.3 to 1.8:1.

15. The method of claim 14 wherein said hydroxybenzene compound is phenol.

16. The composition of claim 1 wherein said dye is selected from the group consisting of disperse and vat dyes.

17. The composition of claim 16 wherein said dye is a quinone or an azo dye.

18. In a method of milling a dye, the steps comprising:
   forming a dye paste of claim 1; and
   milling said paste for a period of time sufficient to reduce the water-insoluble particles thereof to a weight average particle size of about 50 to about 200 angstroms.

19. The method of claim 1 wherein said fabric is subsequently washed with a solution of a reducing agent.

20. As a composition of matter, the lignin adduct produced by the method comprising the steps of:

forming an aqueous reaction mixture of a sulfonated lignin material and a methylol hydroxybenzene compound, said mixture containing about 0.05 to 4.0 millimoles of said compound per gram of the lignin moiety in said lignin material, said compound having the general formula:

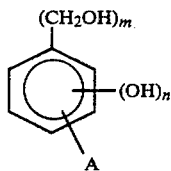

wherein "m" and "n" are both integers from 1 to 3, the total value of "m" and "n" does not exceed 4, and "A" is a one- to four-carbon alkyl group optionally present therein;
establishing in said mixture a temperature in the range of at least 105° to about 180° Centigrade and a pH of about 3 to 12 to effect reaction between said lignin material and said compound; and
maintaining said mixture at a temperature in said range and at a pressure above atmospheric for a period of from about 5 minutes to 8 hours to substantially convert said lignin material and said compound to a lignin adduct.

21. A dyestuff composition comprising a water insoluble dye and a lignin adduct present in a weight ratio to said dye of from about 0.25 to 0.75:1.0, said adduct being produced by the method comprising the steps of:
forming an aqueous reaction mixture of a sulfonated lignin material and a methylol hydroxybenzene compound, said mixture containing about 0.05 to 4.0 millimoles of said compound per gram of the lignin moiety in said lignin material, said compound having the general formula:

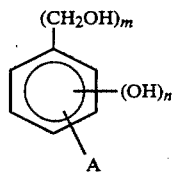

wherein "m" and "n" are both integers from 1 to 3, the total value of "m" and "n" does not exceed 4, and "A" is a one- to four-carbon alkyl group optionally present therein;
establishing in said mixture a temperature in the range of at least 105° to about 180° Centigrade and a pH of about 3 to 12 to effect reaction between said lignin material and said compound; and
maintaining said mixture at a temperature in said range and at a pressure above atmospheric for a period of from about 5 minutes to 8 hours to substantially convert said lignin material and said compound to a lignin adduct.

22. The composition of claim 20 or 21 wherein said adduct produces, in a thermosol stain test, a reflectance value of at least 70, as determined at 457 nanometer units, as a result of said conditions established and maintained for said reaction.

23. The composition of claim 20 or 21 wherein said lignin material is a spent sulfite liquor.

24. The composition of claim 20 or 21 wherein said lignin material is an at least partially desugared spent sulfite liquor.

25. The composition of claim 20 or 21 wherein said lignin material is sodium lignosulfonate.

26. The composition of claim 20 or 21 wherein said lignin material is an alkali lignin sulfonated to an organic sulfur content of about 2 to 7 percent by weight.

27. The composition of claim 20 or 21 wherein said reaction temperature range is about 125° to 145° Centigrade.

28. The composition of claim 20 or 21 wherein said pressure is autogenous.

29. The composition of claim 20 or 21 wherein, in said compound, "n" has a value of 1 and "A" is absent.

30. The composition of claim 20 or 21 wherein said adduct is the product of a mixture of said methylol hydroxybenzene compounds in which "n" has a value of 1 and "A" is absent, said mixture providing an averaged "m" value of 1.3 to 1.8.

31. The composition of claim 20 wherein said method includes the additional steps, effected prior to the formation of said reaction mixture of lignin material and hydroxybenzene compound, of:
forming a methylolation reaction mixture comprised of a hydroxybenzene compound and formaldehyde; and establishing and maintaining therein reaction conditions under which said methylol hydroxybenzene compound is produced in substantial amounts.

32. The composition of claim 31 wherein said methololation reaction mixture is aqueous, and wherein said reaction conditions for producting said methylol hydroxybenzene compound include a pH value of about 10.5 to 12, a temperature of about 60° to 80° Centigrade, atmospheric pressure, and a period of at least 15 minutes duration, said formaldehyde being present in said methylolation reaction mixture in a ratio to said hydroxybenzene compound of about 1 to 3:1, and being substantially completely consumed during said methylolation reaction.

33. The composition of claim 32 wherein said hydroxybenzene compound of which said methylolation reaction mixture is formed is phenol.

34. The composition of claim 32 wherein pH has a maximum value of about 11.5 and wherein said period of reaction is about one-half to two hours, the molar ratio of formaldehyde to said hydroxybenzene compound present in said methylolation reaction mixture being about 1.3 to 1.8:1.

35. The composition of claim 34 wherein said hydroxybenzene compound of which said methylolation reaction mixture is formed is phenol.

36. As a dye paste, a dyestuff composition and water, said dyestuff composition constituting about 35 to 55 weight percent of said paste, and being comprised of a water-insoluble dye and a lignin adduct, said lignin adduct being present in said dyestuff composition in a weight ratio to said dye of from about 0.25 to 0.75:1.0, and being produced by the method comprising the steps of:
forming an aqueous reaction mixture of a sulfonated lignin material and a methylol hydroxybenzene compound, said mixture containing about 0.05 to 4.0 millimoles of said compound per gram of the lignin moiety in said lignin material, said compound having the general formula:

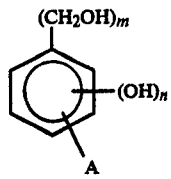

wherein "m" and "n" are both integers from 1 to 3, the total value of "m" and "n" does not exceed 4, and "A" is a one- to four-carbon alkyl group optionally present therein;

establishing in said mixture a temperature in the range of at least 105° to about 180° Centigrade and a pH of about 3 to 12 to effect reaction between said lignin material and said compound; and maintaining said mixture at a temperature in said range and at a pressure above atmospheric for a period of from about 5 minutes to 8 hours to substantially convert said lignin material and said compound to a lignin adduct.

37. In a thermosol dyeing process, the steps comprising:

forming a dye paste;

applying said dye paste to the fabric; and fixing the dye of said paste at a temperature of at least about 200° Centigrade; said dye paste comprising a dyestuff composition and water, said dyestuff composition constituting about 35 to 55 weight percent of said paste and in turn being comprised of a water-insoluble dye and a lignin adduct, said lignin adduct being present in said dyestuff composition in a weight ratio to said dye of from about 0.25 to 0.75:1.0, and being produced by the method comprising the steps of:

forming an aqueous reaction mixture of a sulfonated lignin material and a methylol hydroxybenzene compound, said mixture containing about 0.05 to 4.0 millimoles of said compound per gram of the lignin moiety in said lignin material, said compound having the general formula:

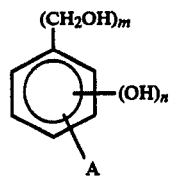

wherein "m" and "n" are both integers from 1 to 3, the total value of "m" and "n" does not exceed 4, and "A" is a one- to four-carbon alkyl group optionally present therein;

establishing in said mixture a temperature in the range of at least 105° to about 180° Centigrade and a pH of about 3 to 12 to effect reaction between said lignin material and said compound; and maintaining said mixture at a temperature in said range and at a pressure above atmospheric for a period of from about 5 minutes to 8 hours to substantially convert said lignin material and said compound to a lignin adduct.

38. The process of claim 37 wherein said adduct produces, in a thermosol strain test, a reflectance value of at least 70, as determined at 457 nanometer units, as a result of said conditions established and maintained for said reaction.

39. The process of claim 37 wherein said lignin material is sodium lignosulfonate.

40. The process of claim 37 wherein said reaction temperature range is about 125° to 145° Centigrade.

41. The process of claim 37 wherein said adduct is the product of a mixture of said methylol hydroxybenzene compounds in which "n" has a value 1 and "A" is absent, said mixture providing an averaged "m" value of 1.3 to 1.8.

* * * * *

UNITED STATES PATENT AND TRADEMARK OFFICE
CERTIFICATE OF CORRECTION

PATENT NO. : 4,444,562
DATED : April 24, 1984
INVENTOR(S) : Stephen Y. Lin

It is certified that error appears in the above—identified patent and that said Letters Patent is hereby corrected as shown below:

Claim 5, line 1, insert after "material" -- is --.

Claim 16, line 1, delete the numeral "1", and substitute therefor the numeral -- 21 --.

Claim 18, line 2, delete the numeral "1", and substitute therefor the numeral -- 36 --.

Claim 19, line 1, delete the numeral "1", and substitute therefor the numeral -- 37 --.

Signed and Sealed this

Twenty-eighth Day of August 1984

[SEAL]

Attest:

*Attesting Officer*

GERALD J. MOSSINGHOFF

*Commissioner of Patents and Trademarks*